(12) United States Patent
Suzuki

(10) Patent No.: US 9,533,527 B2
(45) Date of Patent: Jan. 3, 2017

(54) DIFFRACTION GRATING RECORDING MEDIUM

(75) Inventor: Shinichiro Suzuki, Chiba (JP)

(73) Assignee: DAI NIPPON PRINTING CO., LTD., Tokyo (JP)

( * ) Notice: Subject to any disclaimer, the term of this patent is extended or adjusted under 35 U.S.C. 154(b) by 0 days.

(21) Appl. No.: 14/396,233

(22) PCT Filed: Apr. 25, 2012

(86) PCT No.: PCT/JP2012/061026
§ 371 (c)(1),
(2), (4) Date: Oct. 22, 2014

(87) PCT Pub. No.: WO2013/161015
PCT Pub. Date: Oct. 31, 2013

(65) Prior Publication Data
US 2016/0001585 A1    Jan. 7, 2016

(51) Int. Cl.
| | | |
|---|---|---|
| G02B 5/18 | (2006.01) |
| B42D 25/328 | (2014.01) |
| B42D 25/29 | (2014.01) |
| B42D 25/00 | (2014.01) |

(52) U.S. Cl.
CPC .............. *B42D 25/328* (2014.10); *B42D 25/00* (2014.10); *B42D 25/29* (2014.10); *G02B 5/1809* (2013.01); *G02B 5/1823* (2013.01); *G02B 5/1828* (2013.01); *G02B 5/1861* (2013.01); *B42D 2035/14* (2013.01)

(58) Field of Classification Search
CPC combination set(s) only.
See application file for complete search history.

(56) References Cited

U.S. PATENT DOCUMENTS 3,640,009 A * 2/1972 Komiyama ........ G07C 9/00055
283/112
4,175,775 A * 11/1979 Kruegle ................. G06K 19/14
283/111

(Continued)

FOREIGN PATENT DOCUMENTS

JP      S60-30948        7/1985
JP      2002-372610 A1   12/2002

(Continued)

OTHER PUBLICATIONS

International Search Report for International Application No. PCT/JP2012/061026 dated May 29, 2012.

*Primary Examiner* — Bumsuk Won
*Assistant Examiner* — Balram Parbadia
(74) *Attorney, Agent, or Firm* — Kratz, Quintos & Hanson, LLP

(57) ABSTRACT

A diffraction grating recording medium (3) that enhances the ability to prevent forgery and make security more reliable. The diffraction grating recording medium (3) comprises a first recording region (31) including viewing image unit cells (11a), (12a), (13a) having a light diffraction structure, and a second recording region (32) including hidden image unit cells (2a). The viewing image unit cells of the first recording region (31) has a grating pitch more than the wavelength of visible light, and the hidden image unit cells of the second recording region (32) has a grating pitch less than the wavelength of visible light.

2 Claims, 11 Drawing Sheets

(56) References Cited

U.S. PATENT DOCUMENTS

| | | | | |
|---|---|---|---|---|
| 5,193,854 | A | * | 3/1993 | Borowski, Jr. ....... A63F 3/0685 283/87 |
| 5,284,364 | A | * | 2/1994 | Jain .................. G06K 1/12 283/87 |
| 5,367,148 | A | * | 11/1994 | Storch ................ G06F 11/14 235/375 |
| 5,522,623 | A | * | 6/1996 | Soules ................ A63F 1/14 283/88 |
| 5,784,200 | A | * | 7/1998 | Modegi ............... G02B 5/1847 359/2 |
| 6,425,606 | B1 | * | 7/2002 | Lu .................... B42D 25/328 283/901 |
| 6,865,001 | B2 | * | 3/2005 | Long .................. G03H 1/041 283/86 |
| 8,323,780 | B1 | * | 12/2012 | Simske ............... B41M 3/14 283/85 |

FOREIGN PATENT DOCUMENTS

| | | | | |
|---|---|---|---|---|
| JP | 2002372610 | A | * 12/2002 | ......... G03H 1/0011 |
| JP | 2004-212927 | A1 | 7/2004 | |
| JP | 2008-275740 | A1 | 11/2008 | |
| JP | 2011-7967 | A1 | 1/2011 | |

* cited by examiner

DIFFRACTION GRATING RECORDING MEDIUM

TECHNICAL FIELD

The present invention relates to a diffraction grating recording medium that is applied or transferred onto an article or other stuff for forgery prevention.

BACKGROUND OF THE INVENTION

A variety of forgery prevention means have so far been used with articles requiring authorization plus forgery prevention like cards such as cash cards, credit cards and check cards, tradable coupons, and important documents. For instance, a credit card is provided on its surface with a rainbow hologram comprising a relief hologram including a metal reflective layer in the form of an authorization structure for card authentication by visual inspection. An apparatus for recording such a hologram is disclosed in Patent Publication 1.

PRIOR ART PUBLICATIONS

Patent Publication 1: JP(B) 60-30948
Patent Publication 2: JP(A) 2004-212927

SUMMARY OF THE INVENTION

Objects of the Invention

However, such diffraction gratings as holograms include a diffraction grating having a relatively rough grating pitch so much so that it can be relatively easily fabricated by double beam interferometry, a dot matrix method or the like. In other words, there is still a risk that diffraction grating on apparently similar levels may be easily fabricated.

An object of the present invention is to provide a diffraction grating recording medium that does not only enhance the ability to prevent forgery but also makes security more reliable.

Means for Achieving the Objects

To achieve the abovementioned object, the diffraction grating recording medium of the invention is characterized by comprising a first recording region including viewing image unit cells having a light diffraction structure, and a second recording region including hidden image unit cells having a light diffraction structure, wherein said viewing image unit cells of said first recording region have a grating pitch more than the wavelength of visible light, and said hidden image unit cells of said second recording region have a grating pitch less than the wavelength of visible light.

Another characteristic feature of the invention is that said second recording region is smaller than said first recording region.

Yet another characteristic feature of the invention is that the ratio between said first recording region and said second recording region is in a range of 5:1 to 10:1.

A further characteristic feature of the invention is that said second recording region is formed in a parallel linear form with respect to said first recording region.

Advantages of the Invention

According to the invention, it is possible to provide a diffraction grating recording medium having not only a high ability to prevent forgery but also more reliable security.

MODES FOR CARRYING OUT THE INVENTION

The diffraction grating recording medium according to the present invention is now explained with reference to the accompanying drawings.

Figure 1:
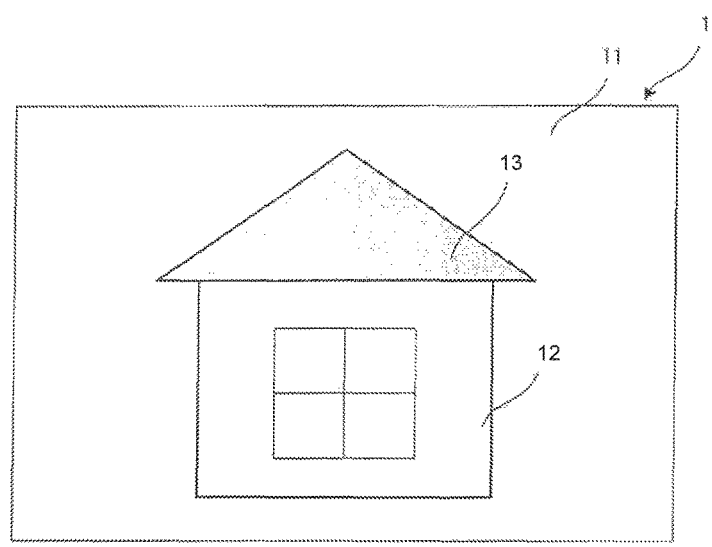
FIG. 1 is illustrative of image data of an original image according to the first embodiment of the invention.

FIG. 1 is representative of image data of an original image 1 according to the first embodiment of the invention.

The original image 1 according to the first embodiment of the invention comprises a pattern generated as electronic information on a computer and including a first pattern region 11, a second pattern region 12 and a third pattern region 13.

Figure 2:
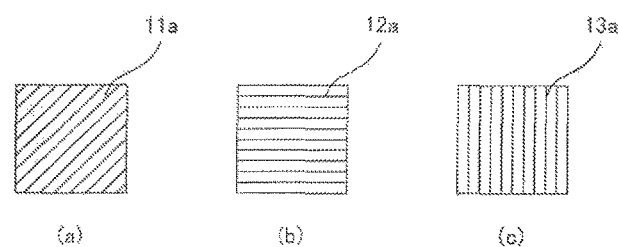
FIG. 2 is illustrative of unit cells forming the image data according to the first embodiment of the invention.

FIG. 2 is illustrative of unit cells for the pattern regions of the image data according to the first embodiment of the invention.

FIG. 2(a) is illustrative of a first viewing image unit cell 11a corresponding to the first pattern region 11. The first viewing image unit cell 11a corresponding to the first pattern region 11, for instance, is formed at a grating pitch of 1.0 μm and a grating angle of 45°. FIG. 2(b) is illustrative of a second viewing image unit cell 12a corresponding to the second pattern region 12. The second viewing image unit cell 12a corresponding to the second pattern region 12, for instance, is formed at a grating pitch of 1.0 μm and a grating angle of 0°. FIG. 2(c) is illustrative of a third viewing image unit cell 13a corresponding to the third pattern region 13. The second observation image unit cell 13a corresponding to the third pattern region 13, for instance, is formed at a grating pitch of 1.0 μm and a grating angle of 90°.

The original image 1 may comprise at least the first pattern region 11, although it comprises three regions: the first 11, the second 12 and the third pattern region 13 in the first embodiment of the invention, as shown in FIG. 1.

Figure 3:
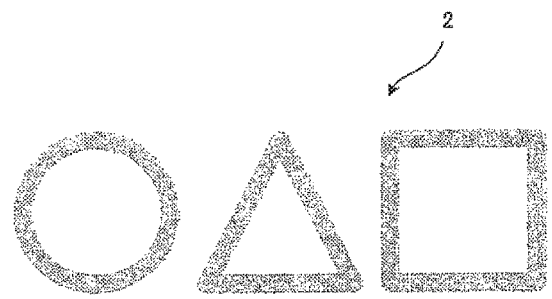
FIG. 3 is illustrative of image data of a hidden image according to the first embodiment of the invention.

FIG. 3 is representative of image data of a hidden image 2 according to the first embodiment of the invention.

As shown in FIG. 3, the hidden image 2 according to the first embodiment of the invention is preferably composed of an image, a pattern, or a character, all being identifiable only under specific observation conditions. The hidden image 2 here is understood to refer to information that is different from the visually identifiable original image 1 and buried in the original image 1 of FIG. 1 in such a way as to be not detrimental to the feature of the original image 1.

Figure 4:
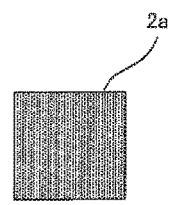
FIG. 4 is illustrative of unit cells of the hidden image according to the first embodiment of the invention.

FIG. 4 is illustrative of a unit cell 2a for the hidden image 2 according to the first embodiment of the invention.

The unit cells 2a for the hidden image 2, for instance, are formed at a grating pitch of 400 nm.

The grating pitch of the unit cells is now explained.

Figure 5:
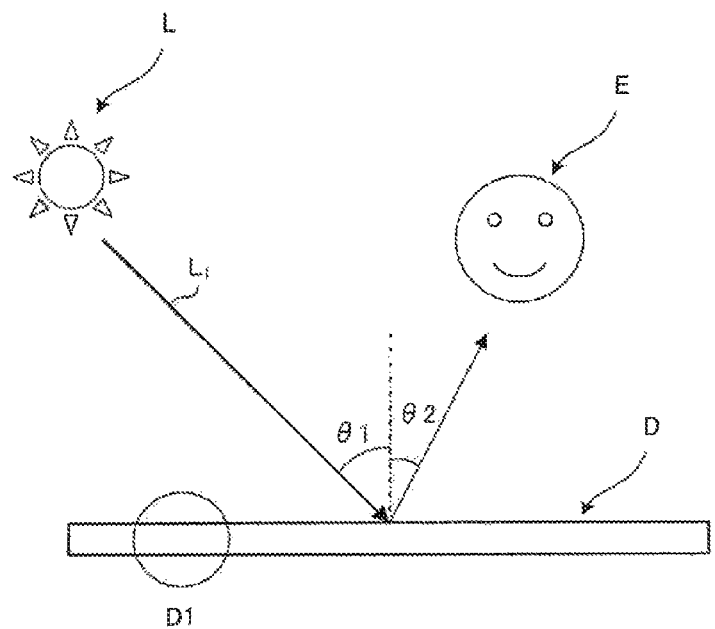
FIG. 5 is illustrative of relations of a light source and a viewer with respect to a diffraction grating.
Figure 6:
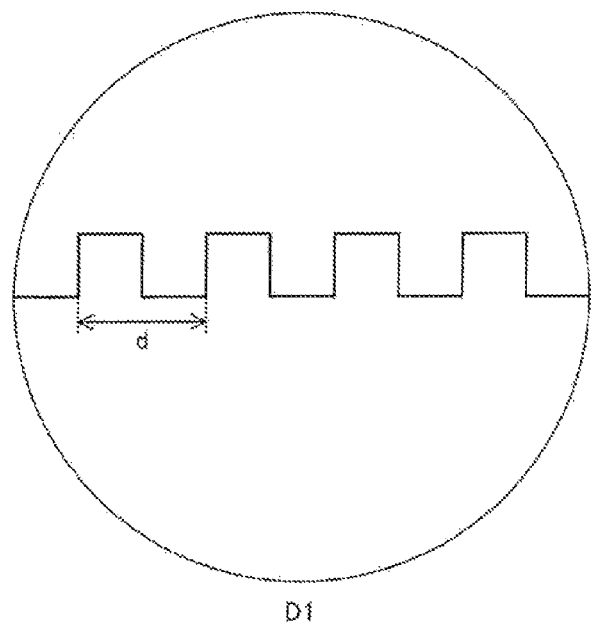
FIG. 6 is an enlarged view of an area D1 in FIG. 5.
Figure 7:
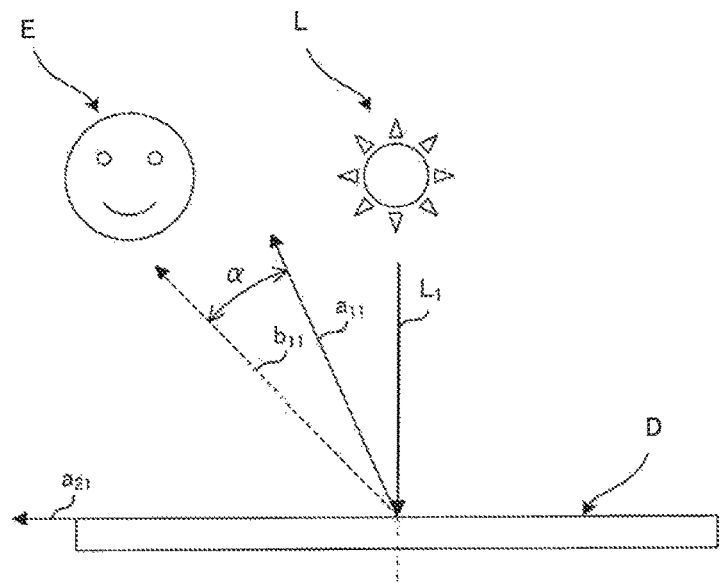
FIG. 7 is illustrative of a first viewing state for a light source and a viewer with respect to a diffraction grating.
Figure 8:
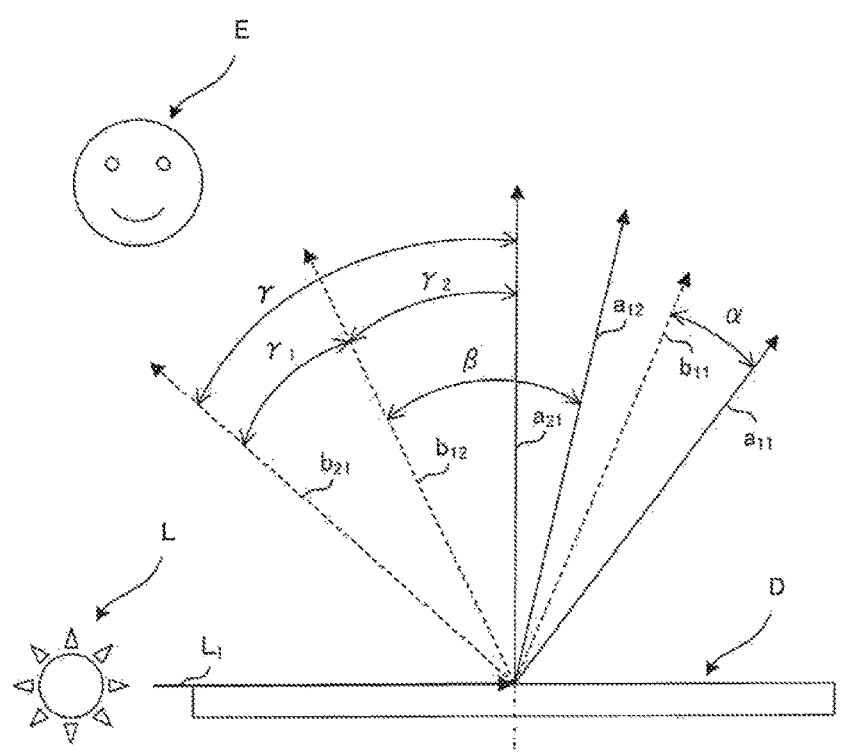
FIG. 8 is illustrative of a second viewing state for a light source and a viewer with respect to a diffraction grating.

FIG. 5 is illustrative of relations of a light source L and a viewer E to a diffraction grating D, and FIG. 6 is an enlarged view of an encircled portion D1. FIG. 7 is illustrative of a first viewing state, and FIG. 8 is illustrative of a second viewing state.

Assume here that the viewer E is viewing a diffraction grating pattern comprising the diffraction grating D in a position having an angle of diffraction θ2 provided that θ1 is an angle of incidence of light L1 from the light source L on the diffraction grating D. Then, the following equation (1) holds on condition that for θ, a counterclockwise direction is positive on the sheet with respect to the angle of incidence of 0°.

$$\lambda = d(\sin\theta_1 + \sin\theta_2)/n \quad (1)$$

where λ is a wavelength,
d is the grating pitch of the diffraction grating,
θ1 is the angle of incidence,
θ2 is the angle of diffraction, and
n is the order of diffraction.

In this embodiment of the invention, the first and second viewing states are usually provided: in the first viewing state it is easy for a human viewer to view the original image 1 as shown in FIG. 7, and in the second viewing state the viewer identifies the hidden image 2 as shown in FIG. 8.

In the first viewing state, the incident light L1 from the light source enters the diffraction grating D at an angle of incidence θ1=0°, as shown in FIG. 7. In this case, the first order diffracted light through a d=1 μm portion of the diffraction grating D diffracts as indicated by a solid line $a_{11}$ at λ=400 nm, and as indicated by a broken line $b_{11}$ at λ=700 nm.

Since the grating pitch d of the first 11a, the second 12a, and the third viewing image unit cells 13a is set at 1 μm, it is possible for the viewer to have an easy viewing of the original image 1 shown in FIG. 1 as far as the range of the first area α is concerned.

However, the first order diffracted light through a portion of the diffraction grating D having a grating pitch of d=400 nm diffracts as indicated by a solid line $a_{21}$ at λ=400 nm, but does not at λ=700 nm, as can be seen from Equation (1). The grating pitch d of the hidden image unit cells 2a shown in FIG. 4 is set at 400 nm, so it is impossible for the viewer to have a viewing of the hidden image 2 of FIG. 2 at both λ=400 nm and λ=700 nm.

In the second viewing state, the incident light $L_1$ from the light source enters the diffraction grating D at an angle of incidence of θ1=90°, as shown in FIG. 8. In this case, the first order diffracted light through a portion of the diffraction grating D having a grating pitch of d=1 μm diffracts as indicated by a solid line $a_{11}$ at λ=400 nm, and as indicated by a broken line $b_{11}$ at λ=700 nm. On the other hand, the second order diffracted light through a portion of the diffraction grating D having a grating pitch of d=1 μm diffracts as indicated by a solid line $a_{12}$ at λ=400 nm, and as indicated by a broken line $b_{12}$ at λ=700 nm.

As the grating pitch d of the first 11a, the second 12a, and the third viewing image unit cells 13a of FIG. 2 is set at 1 μm, it enables the viewer to have an easy viewing of the original image 1 shown in FIG. 1 as far as the first and second areas α and β are concerned.

Then, the first order diffracted light through a portion of the diffraction grating D having a grating pitch of d=400 nm diffracts as indicated by a solid line $a_{21}$ at ⌊=400 nm and as indicated by a broken line $b_{21}$ at λ=700 nm. As the grating pitch d of the hidden image unit cells 2a shown in FIG. 4 is set at 400 nm, it enables the viewer to have an easy viewing of the hidden image 2 as far as the third area γ is concerned. In fact, however, the hidden image 2 overlaps the original image 1 of FIG. 1 in a $3^{rd}$-b area $γ_2$ overlapping the second area β, making it virtually impossible for the viewer to have a viewing of the hidden image 2 shown in FIG. 3. It is thus in a $3^{rd}$-a area $γ_1$ that the viewer can have a viewing of the hidden image 2 shown in FIG. 3.

Thus, the hidden image cannot be viewed in an ordinary viewing state, but can be viewed only at a predetermined viewing angle, making it possible to provide a diffraction grating recording medium that improves more on the ability to prevent forgery and makes security more reliable than could be achieved so far in the art.

Figure 9:
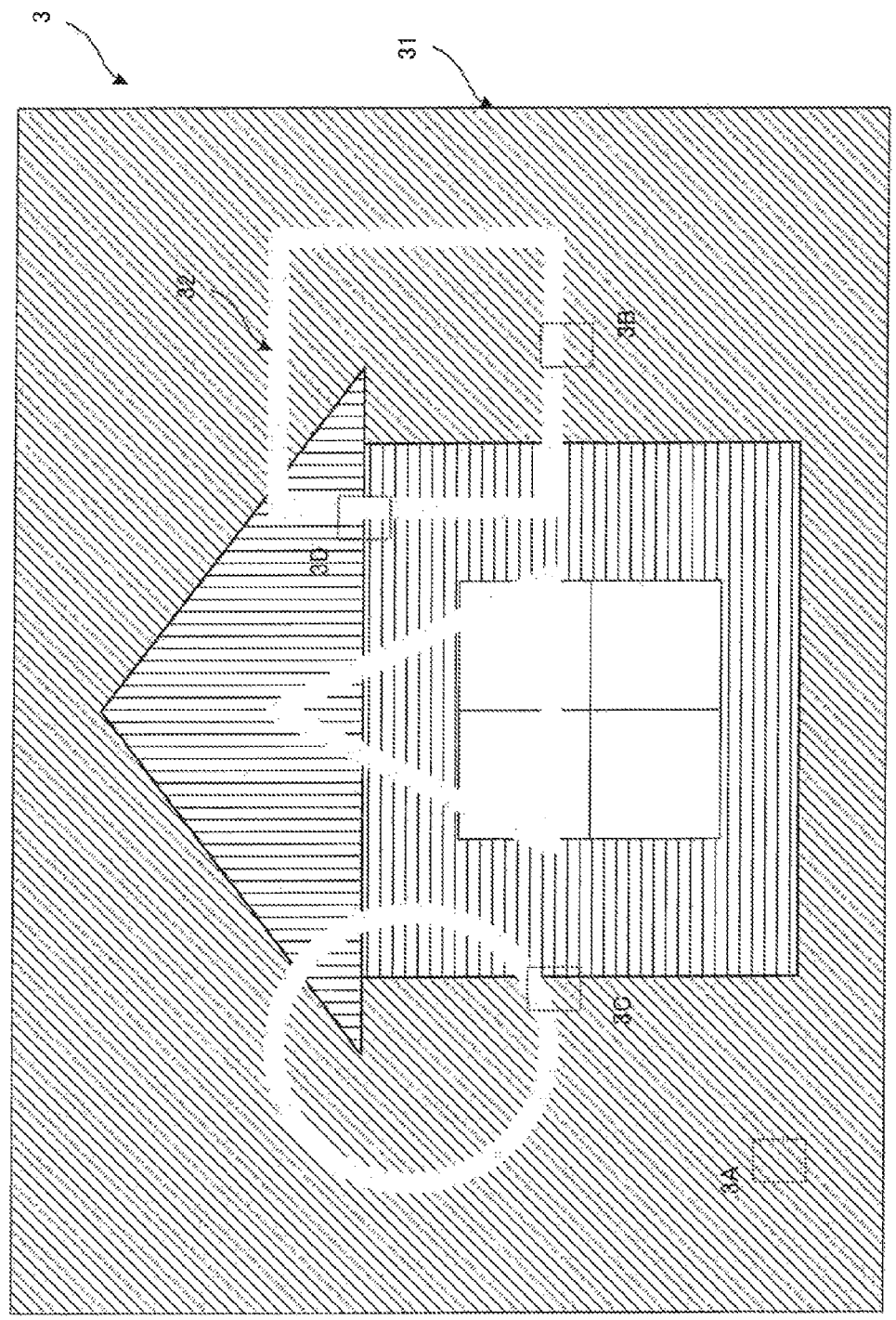
FIG. 9 is illustrative of the diffraction grating recording medium according to the first embodiment of the invention.
Figure 10:
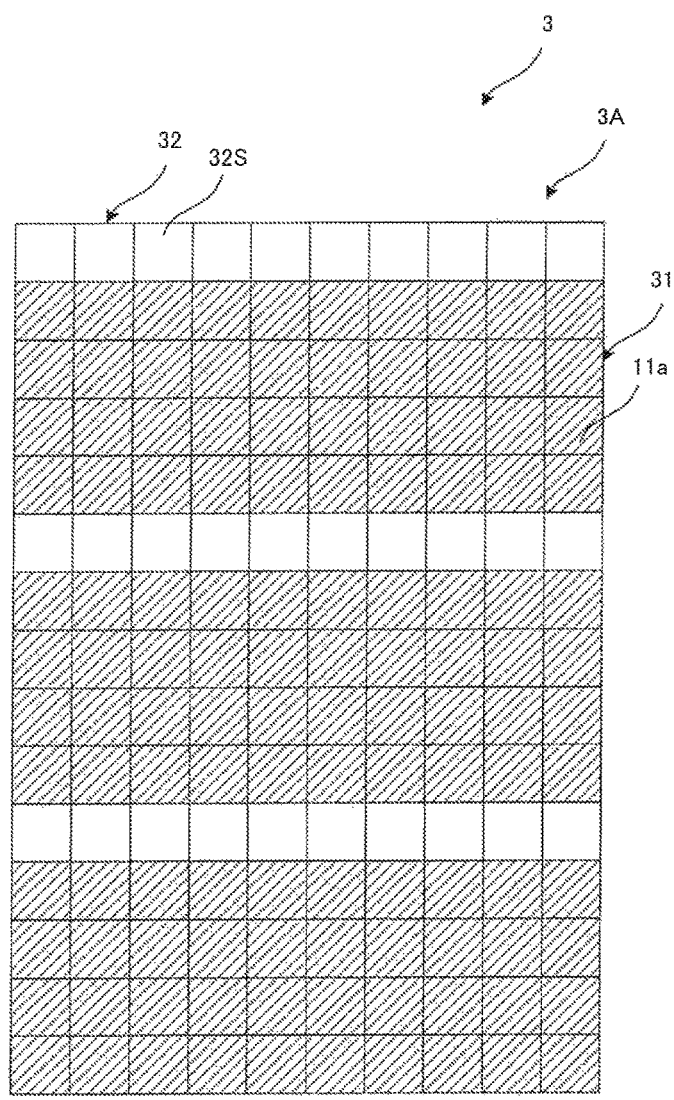
FIG. 10 is an enlarged view of an area 3A in FIG. 9.

FIG. 9 is illustrative of a diffraction grating recording medium 3 according to the first embodiment of the invention, and FIG. 10 is an enlarged view of an area 3A in FIG. 9.

In the recording medium 3 as shown in FIG. 9, a diffraction grating forming the hidden image 2 of FIG. 3 is buried in a diffraction grating forming the original image 1 of FIG. 1.

The diffracting grating recording medium 3 is divided into a first recording region corresponding to the original image 1 of FIG. 1 and a second recording region 32 corresponding to the hidden image 2 shown in FIG. 3. In this embodiment as shown typically in FIG. 10, the area ratio between the first 31 and the second recording region 32 is set at 5:1. It is then preferable that the area ratio between the first 31 and the second recording region 32 is in a range of the order of 5:1 to 10:1.

Thus, the second recording region 32 is smaller than the first recording region 31, and provided in the form of parallel straight lines with respect to the first recording region 31. This makes it possible for the viewer to have an easy viewing of the color hidden image 2 in the second viewing state without detrimental to an image reconstructed from the original image 1 in the first viewing state.

The diffraction grating recording medium 3 is now explained in further details.

FIG. 10 is an enlarged view of an area 3A in FIG. 9.

The area 3A is a portion of the original image 1 corresponding to the first pattern region 11 free of the hidden image 2. In the first recording region 31 of the area 3A, a portion of the original image 1 corresponding to the first pattern region 11 is provided with the first viewing image unit cells 11a. The area 3A is free of the hidden image 2, so the second recording region 32 of the area 3A provides blank cells 32S. It is here to be noted that the first viewing image unit cells 11a may be provided instead of the blank cells 32S. Where there are the blank cells 32S formed, there is a possibility that the blank cells 32S may look like a sort of boundary; however, if the first viewing image unit cells 11a are formed, the possibility that the blank cells may look like a sort of boundary can then be prevented.

Figure 11:
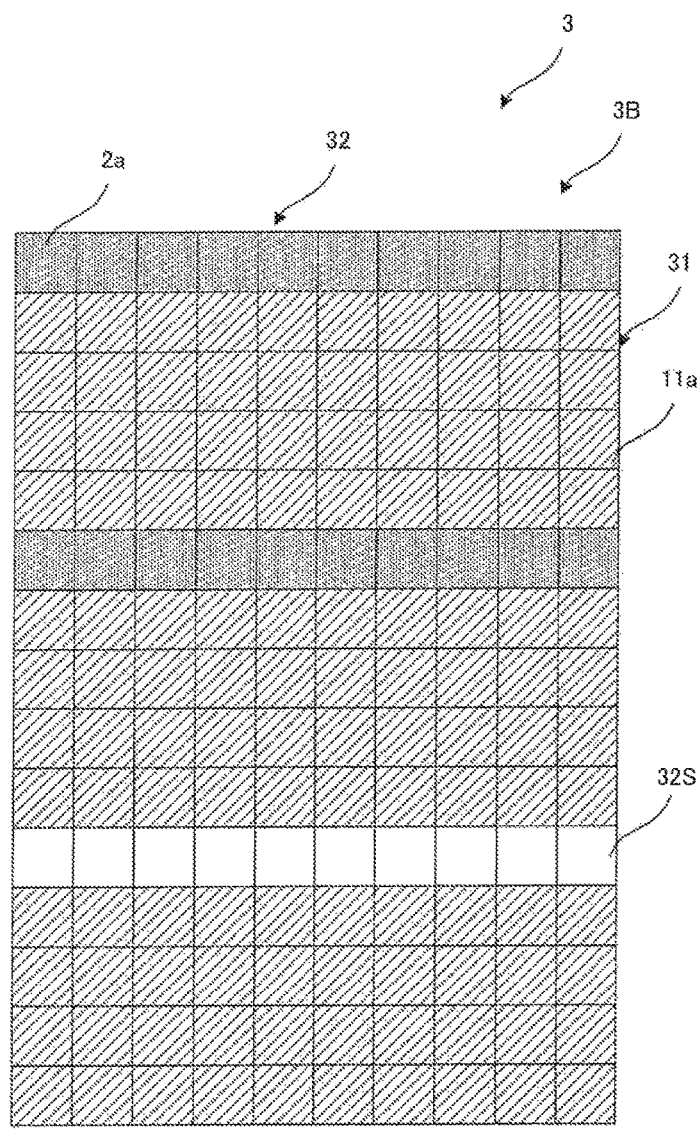
FIG. 11 is an enlarged view of an area 3B in FIG. 9.

FIG. 11 is an enlarged view of an area 3B in FIG. 9.

The area 3B comprises both a portion of the original image 1 corresponding to the first pattern region 11 that includes the hidden image 2 and a portion of the original image 1 corresponding to the first pattern region 11 that is free of the hidden image 2.

In the first recording region 31 of the area 3B, a portion of the original image 1 corresponding to the first pattern region 11 is provided with the first viewing image unit cells 11a, and a portion of the second recording region 32 of the area 3B including the hidden image 2 is provided with unit cells 2a. Further, a portion of the second recording region 32 of the area 3B that is free of the hidden image 2 provides blank cells 32S. It is here to be noted that the first viewing image unit cells 11a may be provided instead of the blank cells 32S. Where there are the blank cells 32S formed, there is a possibility that the blank cells 32S may look like a sort of boundary; however, if the first viewing image unit cells 11a are formed, the possibility that the blank cells may look like a sort of boundary can then be prevented.

Figure 12:
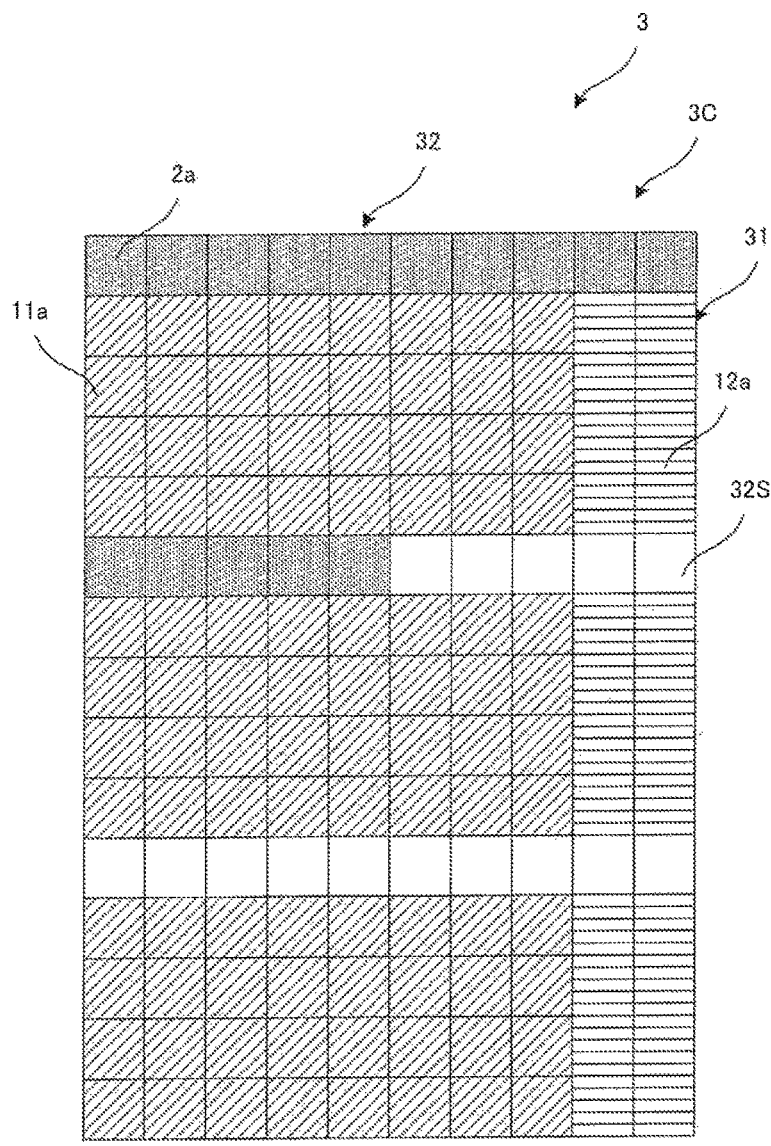
FIG. 12 is an enlarged view of an area 3C in FIG. 9.

FIG. 12 is an enlarged view of an area 3C in FIG. 9.

The area 3C comprises a portion of the original image 1 corresponding to the first pattern region 11 that includes the hidden image 2, a portion of the original image 1 corresponding to the second pattern region 12 that includes the hidden image 2, a portion of the original image 1 corresponding to the first pattern region 11 that is free of the hidden image 2, and a portion of the original image 1 corresponding to the second pattern region 12 that is free of the hidden image 2.

In the recording region 31 of the area 3C, the portion of the original image 1 corresponding to the first pattern region 11 is provided with the first viewing image unit cells 11a, and the portion of the original image 1 corresponding to the second pattern region 12 is provided with the second viewing image unit cells 12a. There are unit cells 2a formed on the portion of the second recording region 32 of the area 3C that includes the hidden image 2. Further, the portion of the second recording region 32 of the area 3C that is free of the hidden image 2 provides blank cells 32S. It is here to be noted that instead of providing the blank cells 32S, the first 11a or the second viewing image unit cells 12a may be selected and formed for each cell. Where there are the blank cells 32S formed, the blank cells 32S may possibly look like a sort of boundary; however, if the first 11a or the second viewing image unit cells 12a are selected and formed for each cell, the possibility that the blank cells 32S may look as a sort of boundary can then be prevented.

Figure 13:
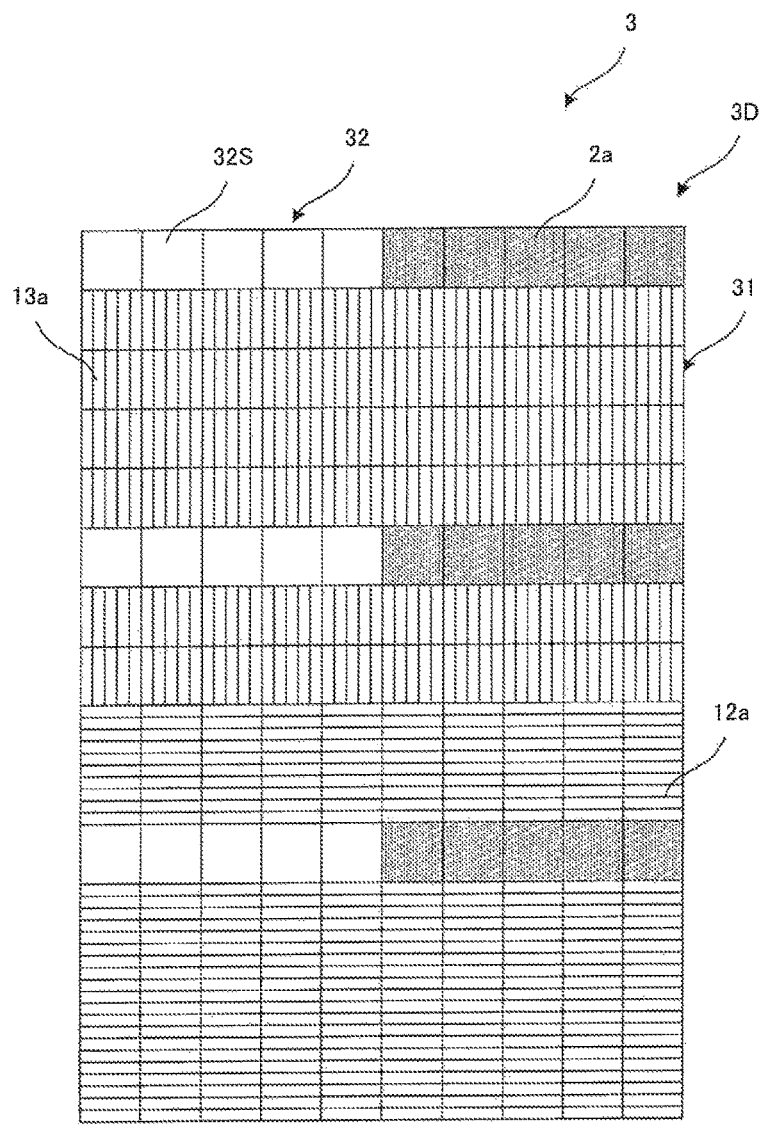
FIG. 13 is an enlarged view of an area 3D in FIG. 9.

FIG. 13 is an enlarged view of an area D3 in FIG. 9.

The area 3D comprises a portion of the original image 1 corresponding to the second pattern region 12 that includes the hidden image 2, a portion of the original image 1 corresponding to the third pattern region 13 that includes the hidden image 2, a portion of the original image 1 corresponding to the second pattern region 12 that is free of the hidden image 2, and a portion of the original image 1 corresponding to the third pattern region 13 that is free of the hidden image 2.

In the first recording region 31 of the area 3D, the portion of the original image 1 corresponding to the second pattern region 12 is provided with the second viewing image unit cells 12a, and the portion of the original image 1 corresponding to the third pattern region 13 is provided with the third viewing image unit cells 13a. The second recording region 32 of the area 3D that includes the hidden image 2 is provided with unit cells 2a. Further, the second recording region 32 of the area C that is free of the hidden image 2 provides blank cells 32S. It is here to be noted that instead of providing the blank cells 32S, the second 12a or the third viewing image unit cells 13a may be selected and formed for each cell. Where there are the blank cells 32S formed, there is a possibility that they may look like a sort of boundary; however, if the second 12a or the third viewing image unit cells 13a are selected and formed for each cell, the possibility that they may look like a sort of boundary can then be prevented.

Figure 14:
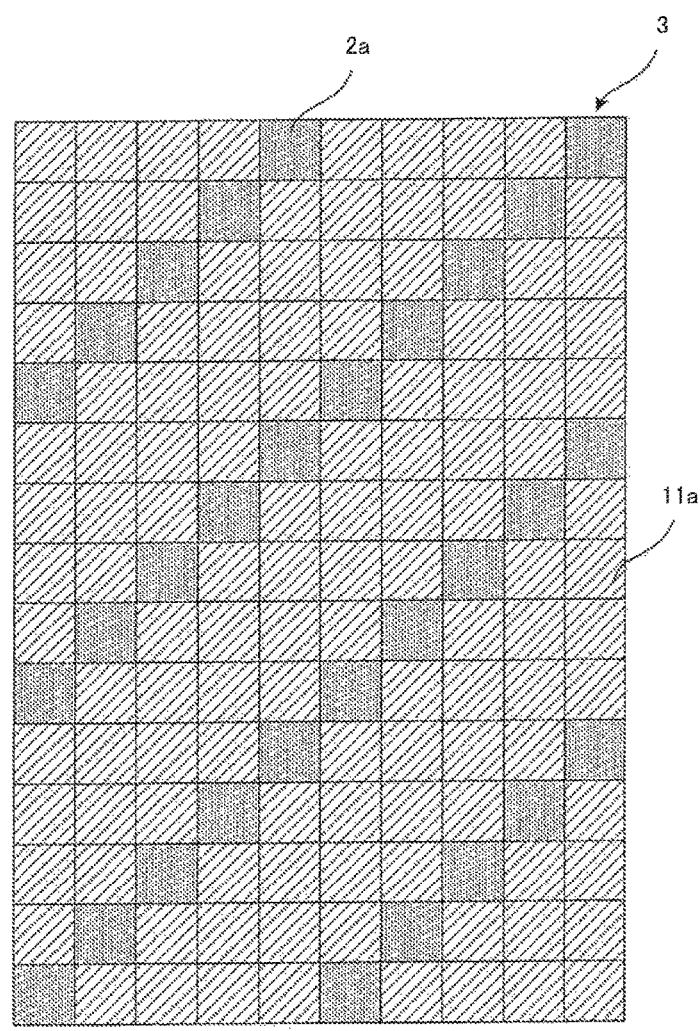
FIG. 14 is illustrative of a part of the diffraction grating recording medium according to the second embodiment of the invention.

FIG. 14 is illustrative of the diffraction grating recording medium 3 according to the second embodiment of the invention.

In the first embodiment of the invention, the second recording regions 32 are horizontally lined up on straight lines as shown in FIGS. 10 to 13. In the second embodiment of the invention, on the other hand, the second recording regions 32 may be lined up on inclined straight lines on the first recording region 31 as shown in FIG. 14.

Figure 15:
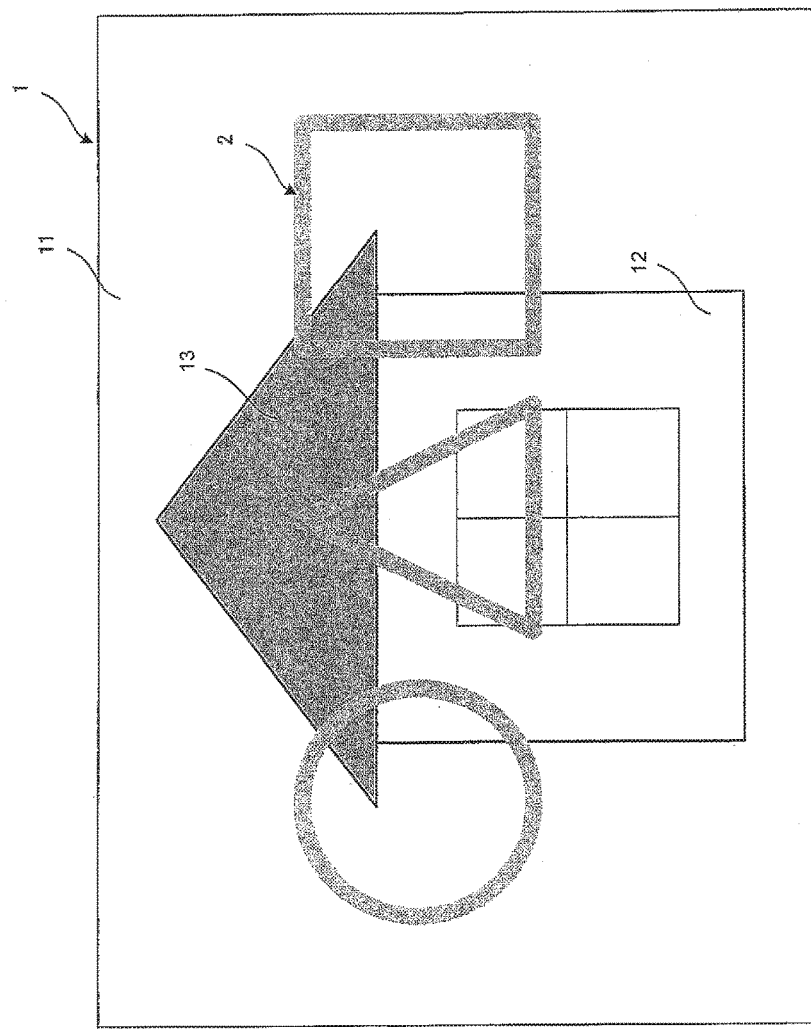
FIG. 15 is illustrative of how the hidden image of the diffraction grating recording medium according to the first embodiment of the invention is being viewed.

FIG. 15 is illustrative of the hidden image in the diffraction grating recording medium according to the first embodiment of the invention being viewed.

Reference is now made to how to view the obtained diffraction grating recording medium 3 in the first, and the second viewing state.

Upon viewing of the diffraction grating recording medium 3 in the first viewing state of FIG. 7, the viewer can have a viewing of only the original image 1 shown in FIG. 1. In the first viewing state, the hidden image 2 cannot be viewed.

Then, upon viewing of the diffraction grating recording medium 3 in the $3^{rd}$-a area $\gamma_1$ in the second viewing state of FIG. 8, the viewer can view the bright hidden image 2 as if it were emerging on the dark original image 1.

How to use the diffraction grating recording medium 3 according to this embodiment is now explained.

Ordinarily, the diffraction grating recording medium 3 used while applied on a printed matter or the like may be designed in the form of a reflection type diffraction grating in which a metal reflective film is provided on a relief surface having a relief structure or a plane. In addition to this, use may also be made of a reflection type diffraction grating in which there is a metal reflective film provided on the back surface of an amplitude type diffraction grating whose amplitude changes periodically or a phase type diffraction grating whose refractive index changes periodically, a volume type diffraction grating constructed of interference fringes formed in a volume type photosensitive material, etc.

Of course, a transmission type diffraction grating may be used instead of the reflection type diffraction grating.

The diffraction grating recording medium 3 may be provided in various forms inclusive of transfer foils, labels and films. The recording medium 3 in a transfer foil form may be applied to, for instance, vouchers, credit cards and packages, and the recording medium 3 in a label form may be applied to, for instance, software, cartridges, and packages for pharmaceuticals. If the recording medium 3 in a film form is micro-slit to a width of about 1 to 2 mm and then incorporated in paper during paper making, it is possible to prevent forgery. Referring to the recording medium 3 in a label form, a fragile layer may be interposed in a layered arrangement. Upon forced peeling of the label for the purpose of forgery, that fragile layer comes off, making it difficult to peel off a display matter for the purpose of forgery (fragile layer).

When the diffraction grating recording medium 3 of this embodiment including the hidden image 2 having a light diffraction structure is provided in a transfer foil, label, fragile label or film form, a layered arrangement and its fabrication process may be the same as in Patent Publication 2 or the like.

While the diffraction grating recording medium of the invention has been explained with reference to some embodiments, it is to be understood that the invention is in no sense limited to them, so it may be modified in various ways.

EXPLANATION OF THE REFERENCE NUMERALS

1: Original Image
11: First Pattern Region
11a: First Viewing Image Unit Cells
12: Second Pattern region
12a: Second Viewing Image Unit Cells
13: Third Pattern Region
13a: Third Viewing Image Unit Cells
2: Hidden Image
2a: (Hidden Image) Unit Cells
3: Recording Medium
31: First Recording Region
32: Second Recording Region

What is claimed is:

1. A diffraction grating recording medium, characterized by comprising:
    a first recording region including viewing image unit cells having a light diffraction structure, and
    a second recording region including hidden image unit cells having a light diffraction structure, wherein:
    said viewing image unit cells of said first recording region have a grating pitch more than a wavelength of visible light,
    said hidden image unit cells of said second recording region have a grating pitch less than the wavelength of visible light,
    said second recording region is smaller than said first recording region,
    said second recording region is provided in a parallel straight line form with respect to said first recording region,
    said viewing image unit cells form together an original image including a first pattern region and a second pattern region,
    said hidden image unit cells form together a hidden image that is identifiable under a specific viewing condition alone,
    said viewing image unit cells include a first viewing image unit cell corresponding to said first pattern region and a second viewing image unit cell corresponding to said second pattern region,
    in said first recording region, a portion of said original image corresponding to said first pattern region is formed by said first viewing image unit cell and a portion of said original image corresponding to said second pattern region is formed by said second viewing image unit cell, and
    in said second recording region, a portion thereof corresponding to said hidden image is formed by said hidden image unit cells, and a portion thereof that does not correspond to said hidden image is formed by cells selected from blank cells, said first viewing image unit cells and said second viewing image unit cells,
    at least
        said first viewing image unit cell which is a portion of said original image corresponding to said first pattern region, and
        said second viewing image unit cell which is a portion of said original image corresponding to said second pattern region,
    are formed in said first recording region.

2. A diffraction grating recording medium, characterized by comprising:
    a first recording region including viewing image unit cells having a light diffraction structure, and
    a second recording region including hidden image unit cells having a light diffraction structure, wherein:
    said viewing image unit cells of said first recording region have a grating pitch more than a wavelength of visible light,
    said hidden image unit cells of said second recording region have a grating pitch less than the wavelength of visible light,
    said second recording region is smaller than said first recording region,
    said second recording region is provided in a parallel straight line form with respect to said first recording region,
    said viewing image unit cells form together an original image including a first pattern region, a second pattern region and a third pattern region,
    said hidden image unit cells form together a hidden image that is identifiable under a specific viewing condition alone,
    said viewing image unit cells include a first viewing image unit cell corresponding to said first pattern region, a second viewing image unit cell corresponding to said second pattern region and a third viewing image unit cell corresponding to said third pattern region,
    in said first recording region, a portion of said original image corresponding to said first pattern region is formed by said first viewing image unit cell, a portion of said original image corresponding to said second pattern region is formed by said second viewing image unit cell, and a portion of said original image corresponding to said third pattern region is formed by said third viewing image unit cell, and
    in said second recording region, a portion thereof corresponding to said hidden image is formed by said hidden image unit cells, a portion thereof that does not correspond to said hidden image is formed by cells selected from blank cells, said first viewing image unit cells, said second viewing image unit cells and said third viewing image unit cells,
    at least
        said first viewing image unit cell which is a portion of said original image corresponding to said first pattern region,
        said second viewing image unit cell which is a portion of said original image corresponding to said second pattern region, and
        said third viewing image unit cell which is a portion of said original image corresponding to said third pattern region,
    are formed in said first recording region.

* * * * *